US011713113B2

(12) United States Patent
Carter, Jr. et al.

(10) Patent No.: US 11,713,113 B2
(45) Date of Patent: *Aug. 1, 2023

(54) COMPOUND ROTORCRAFT WITH PROPELLER

(71) Applicant: JAUNT AIR MOBILITY, LLC, Glassboro, NJ (US)

(72) Inventors: Jay W. Carter, Jr., Burkburnett, TX (US); Jeffrey R. Lewis, Wichita Falls, TX (US); Martin Peryea, Wichita Falls, TX (US)

(73) Assignee: Jaunt Air Mobility, LLC, Glassboro, NJ (US)

( * ) Notice: Subject to any disclaimer, the term of this patent is extended or adjusted under 35 U.S.C. 154(b) by 28 days.

This patent is subject to a terminal disclaimer.

(21) Appl. No.: 17/519,208

(22) Filed: Nov. 4, 2021

(65) Prior Publication Data

US 2022/0055744 A1  Feb. 24, 2022

Related U.S. Application Data

(62) Division of application No. 16/403,479, filed on May 3, 2019, now Pat. No. 11,174,016.

(Continued)

(51) Int. Cl.
*B64C 27/26* (2006.01)
*B64C 29/00* (2006.01)
*B64C 27/08* (2023.01)

(52) U.S. Cl.
CPC .............. *B64C 27/26* (2013.01); *B64C 27/08* (2013.01); *B64C 29/0025* (2013.01)

(58) Field of Classification Search
CPC ......... B64C 27/26; B64C 27/22; B64C 27/08; B64C 27/24; B64C 29/0025

(Continued)

(56) References Cited

U.S. PATENT DOCUMENTS 2,665,859 A * 1/1954 Papadakos .............. B64C 27/26
244/7 R
2,940,693 A * 6/1960 Steedman ............... B64C 27/82
244/6

(Continued)

FOREIGN PATENT DOCUMENTS

GB            673421 A  *  5/1989

*Primary Examiner* — Christopher P Ellis
(74) *Attorney, Agent, or Firm* — Stradley Ronon Stevens & Young, LLP

(57) ABSTRACT

A compound rotorcraft comprises a fuselage, a rotor coupled to the fuselage and a wing mounted to the fuselage. The rotorcraft further comprising a first outboard propeller, a first inboard propeller, a second outboard propeller, and a second inboard propeller. The first outboard propeller having a propeller body and propeller blades, the body mounted to a first wing-half at a first incidence angle. The first inboard propeller having a propeller body and propeller blades, the body mounted to the first wing-half between the first outboard propeller and the fuselage at a second incidence angle. The second outboard propeller having a propeller body and propeller blades, the body mounted to a second wing-half at a third incidence angle. The second inboard propeller comprising a propeller body and propeller blades, the body mounted to a second wing-half between the second outboard propeller in the fuselage at a fourth incidence angle.

5 Claims, 7 Drawing Sheets

Related U.S. Application Data

(60) Provisional application No. 62/666,672, filed on May 3, 2018.

(58) Field of Classification Search
USPC .......................................................... 244/6
See application file for complete search history.

(56) References Cited

U.S. PATENT DOCUMENTS

| | | | | |
|---|---|---|---|---|
| 3,385,537 | A * | 5/1968 | Lighten | B64C 27/54 244/6 |
| 8,376,266 | B2 * | 2/2013 | Gemmati | B64C 27/22 244/175 |
| 8,979,015 | B2 * | 3/2015 | Gaillard | B64C 27/82 244/17.19 |
| 10,101,719 | B1 * | 10/2018 | Kroo | B64C 13/503 |
| 10,144,510 | B1 * | 12/2018 | Vander Lind | B64F 3/00 |
| 10,676,188 | B2 * | 6/2020 | Campbell | B64C 27/26 |
| 10,836,482 | B2 * | 11/2020 | Gaffiero | B64C 11/46 |
| 2002/0011539 | A1 * | 1/2002 | Carter, Jr. | B64C 27/26 244/6 |
| 2003/0094537 | A1 * | 5/2003 | Austen-Brown | B64C 29/0033 244/7 R |
| 2007/0170307 | A1 * | 7/2007 | de la Cierva Hoces | B64C 27/24 244/7 R |
| 2009/0159740 | A1 * | 6/2009 | Brody | B64C 27/10 244/60 |
| 2010/0065677 | A1 * | 3/2010 | Ferrier | B64C 27/26 244/6 |
| 2010/0327123 | A1 * | 12/2010 | Smith | B64C 27/26 244/7 C |
| 2012/0153072 | A1 * | 6/2012 | Eglin | B64C 27/26 244/17.13 |
| 2012/0168556 | A1 * | 7/2012 | Sonneborn | B64C 27/025 244/17.11 |
| 2012/0280091 | A1 * | 11/2012 | Saiz | B64C 27/30 244/6 |
| 2014/0061367 | A1 * | 3/2014 | Fink | B64C 27/26 244/6 |
| 2014/0084106 | A1 * | 3/2014 | Eglin | B64D 45/00 244/6 |
| 2014/0353420 | A1 * | 12/2014 | Prud'Homme-Lacroix | B64D 31/00 244/6 |
| 2016/0200436 | A1 * | 7/2016 | North | B64C 5/02 244/7 R |
| 2016/0207625 | A1 * | 7/2016 | Judas | B64C 39/08 |
| 2018/0057158 | A1 * | 3/2018 | Vialle | B64C 27/82 |
| 2018/0077350 | A1 * | 3/2018 | Grenier | H04N 13/239 |
| 2018/0305005 | A1 * | 10/2018 | Parks | B64C 27/30 |
| 2018/0312251 | A1 * | 11/2018 | Petrov | B64D 27/12 |
| 2019/0329881 | A1 * | 10/2019 | Gaffiero | B64C 11/46 |
| 2019/0337614 | A1 * | 11/2019 | Villa | B64C 9/38 |
| 2020/0062386 | A1 * | 2/2020 | Zhang | B64C 27/28 |
| 2020/0156778 | A1 * | 5/2020 | McDonald | B64D 27/24 |
| 2020/0180755 | A1 * | 6/2020 | Prud'Homme Lacroix | B64C 27/52 |
| 2020/0217658 | A1 * | 7/2020 | Abdelli | G08G 5/0086 |
| 2020/0223540 | A1 * | 7/2020 | Ivans | B64C 27/82 |
| 2020/0269975 | A1 * | 8/2020 | Fink | B64C 29/0033 |
| 2020/0309066 | A1 * | 10/2020 | Ross | B64C 27/26 |
| 2021/0047028 | A1 * | 2/2021 | Choi | B64C 27/82 |

\* cited by examiner

COMPOUND ROTORCRAFT WITH PROPELLER

CROSS-REFERENCE TO RELATED APPLICATION

This application is a divisional of U.S. application Ser. No. 16/403,479, titled, "Compound Rotorcraft With Propeller," filed May 3, 2019, which itself claims the the benefit of U.S. Provisional Application No. 62/666,672 filed May 3, 2018, the content of which are both incorporated herein by reference in their entirety.

TECHNICAL FIELD

This disclosure is directed, in general, to rotorcraft, and more specifically, to compound rotorcraft that use propellers to counter rotor torque and provide forward thrust.

BACKGROUND

Rotorcraft consist of an airframe attached to at least one rotor and include, for example, helicopters, gyrocopters, and compound and slowed-rotor compound aircraft such as gyroplanes and heliplanes. Rotorcraft can generally take-off and land vertically and have excellent low speed performance. However, typical rotorcraft suffer from limitations in horizontal flight, particularly at high forward speeds. Fixed wing airplanes typically have excellent performance in forward flight, and when designed appropriately, can have excellent performance at high forward speeds. However, typical airplanes have poor performance at the very slow speeds possible in rotorcraft, and require a runway for takeoffs and landings.

In rotorcraft, when the rotor is powered in flight, it is generally through a driveshaft, and so there must be a means to counter that torque so that it does not create a yawing torque on the airframe. For a rotorcraft with a single rotor, this is often with a tail rotor or by redirecting the rotor downwash with a NOTAR (no tail rotor) system.

Rotorcraft typically control the aircraft through manipulation of the main rotor and tail rotor, tilting the main rotor to control pitch and roll, and varying the tail rotor thrust to control yaw. Failure or jamming of the mechanism to control main rotor tilt would reduce or eliminate the pilot's ability to control the aircraft.

Rotorcraft with wings can also use airplane-type controls of ailerons on the wings for roll control, an elevator on the horizontal tail for pitch control, and a moveable rudder on the vertical tail for yaw control. While this provides some redundancy to the rotor control, in high speed cruise conditions if the rotor is unloaded, the rotor is typically not generating enough lift to control the aircraft, so failure or jamming of the airplane-type controls would reduce or eliminate the pilot's ability to control the aircraft. At low speeds, there is typically not enough airflow over the airplane-type controls to control the aircraft, so failure or jamming of the mechanism to control main rotor tilt would still reduce or eliminate the pilot's ability to control the aircraft.

Aircraft also experience a type of retarding force known as induced drag, and in wing supported aircraft, a major source of induced drag is the vortex that forms at the wing tip. This vortex is a consequence of the higher pressure on the lower surface of the wing and the lower pressure on the upper surface of the wing creating a tendency for the air to flow from the high pressure region to the low pressure region. This is in effect a leak, reducing the pressure differential between the upper and lower surface, such that the wing must operate at higher angles of attack to achieve the same lift as if the vortex did not occur. From an energy perspective, the vortex takes energy from the aircraft system which is dissipated by the vortex rather than contributing to the operation of the aircraft.

SUMMARY

According to an illustrative embodiment, a compound rotorcraft comprises a fuselage, a rotor coupled to the fuselage and a wing mounted to the fuselage. The rotorcraft further comprising a first outboard propeller, a first inboard propeller, a second outboard propeller, and a second inboard propeller. The first outboard propeller having a propeller body and propeller blades, the body mounted to a first wing-half at a first incidence angle. The first inboard propeller having a propeller body and propeller blades, the body mounted to the first wing-half between the first outboard propeller and the fuselage at a second incidence angle. The second outboard propeller having a propeller body and propeller blades, the body mounted to a second wing-half at a third incidence angle. The second inboard propeller comprising a propeller body and propeller blades, the body mounted to a second wing-half between the second outboard propeller and the fuselage at a fourth incidence angle.

According to another illustrative embodiment, a compound rotorcraft comprises a fuselage, a rotor coupled to the fuselage, and a wing extending from the fuselage. The wing includes a first wing half extending to one side of the fuselage and a second wing half extending to the other side of the fuselage. The compound rotorcraft further comprises a plurality of counterrotating propellers mounted to the wing that are configured to provide forward propulsion. The plurality of propellers includes a first propeller and a second propeller. The first propeller comprising a first propeller body and first propeller blades, the first propeller body mounted on a tip of the first wing half such that a portion of the first propeller body extends beyond the tip of the first wing half, the first propeller blades configured to rotate outboard on the top half of the arc of rotation and inboard on the bottom half of the arc rotation to impart a rotational momentum to the slipstream behind the first propeller in the opposite direction of a first wing tip vortex. The second propeller comprising a second propeller body and a second propeller blades, the second propeller body mounted to a tip of the second wing half such that a portion of the second propeller body extends beyond the tip of the second wing half, the second propeller blades configured to rotate outboard on the top half of the arc of rotation and inboard on the bottom half of the arc of rotation to impart a rotational momentum to the slipstream behind the second propeller in the opposite direction of a second wing tip vortex.

In yet another illustrative embodiment a method for operating a compound rotorcraft comprises mounting a first outboard propeller to a distal end of a first wing half at a first incidence angle relative to a centerline of a fuselage, mounting a second outboard propeller to a distal end of a second wing half at a second incidence angle relative to the center line of the fuselage, mounting a first inboard propeller to the first wing half between the first outboard propeller and the fuselage, and mounting a second inboard propeller to the second wing half between the second outboard propeller in the fuselage. Method further comprises applying positive or negative thrust to the first outboard propeller and the second outboard propeller, wherein applying positive thrust to the first outboard propeller and the second outboard propeller results in a slight upward vertical component of thrust; and applying positive or negative thrust to the first inboard propeller and the second inboard propeller, where applying positive thrust to the first inboard propeller and the second inboard propeller results in a slight downward vertical component of thrust.

Other embodiments are included below and contemplated herein.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
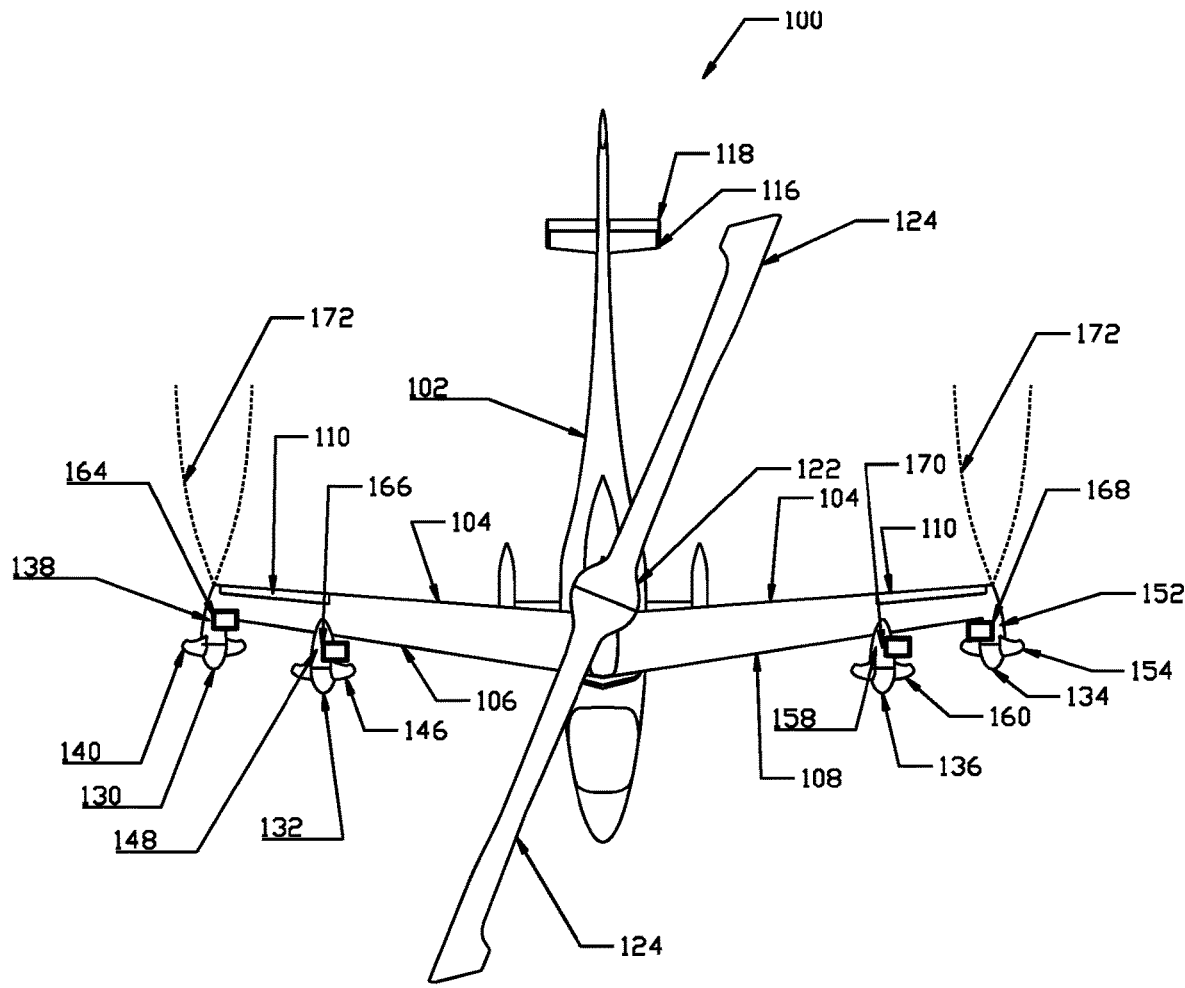
FIG. 1 is top view of an illustrative embodiment of a compound rotorcraft having four propellers.

A fixed wing rotorcraft uses differential thrust between wing mounted propellers to provide counter torque when the rotor is being powered by a power source. The rotorcraft is comprised of a fuselage to which they fixed wing is attached. A rotor is attached on an upper side of the fuselage and provides lift at low speeds while the wing provides a majority of the lift at high speeds. When at high speeds, the rotor may be slowed to reduce advancing tip speed and retreating blade stall. Forward thrust and counter torque are provided by propellers mounted on the wing. Through appropriate installation, the propellers will contribute to both yaw and roll control, as well as reduce induced drag through interaction with the wing tip vortex.

The objective of the present invention is a compound helicopter capable of operating at high speeds, with propellers mounted on the wing to provide forward thrust and to counter rotor torque, with the location of the propellers on the wing tips reducing induced drag, and the installation of the propellers optionally providing roll and yaw control.

In a first embodiment, the aircraft of this invention has a fuselage with a wing extending from opposite sides of the fuselage for providing lift during forward flight. A rotor mounts to the upper side of the fuselage for vertical take-off and for hovering. The rotor is capable of being driven by a power source. Propellers are mounted on the wing, with a minimum of one propeller on either side of the fuselage at the wing tip. The propellers are driven by a power source or independent power sources.

The propellers counter the torque produced by the rotor while the rotor is being driven by the power source. The pitch is controlled on the propellers to offset torque produced by the rotor. The propellers also provide forward propulsion in certain flight regimes. The propellers on the wing tips are counter rotating, with the direction of rotation being outboard on the top half of the arc of rotation, and inboard on the bottom half of the arc of rotation, to reduce the wing tip vortex and induced drag.

The propellers are preferably mounted at an angle to the centerline of the aircraft, to create a vertical thrust component. With appropriate control of the propellers, this vertical thrust component creates a rolling moment on the aircraft. In embodiments with four or more propellers, each propeller on one side of the aircraft are installed in opposite sense angles. That is, if one propeller on a side is at a positive incidence angle, the other propeller on that side is at a negative incidence angle. This allows for yaw control without inducing a roll moment, or for roll control without inducing a yawing moment.

Each propeller and the rotor, collectively known as propulsors, are preferably connected to independent electric power sources. This provides redundancy in case of the failure of any one power source, and allows each propulsor to operate at an rpm independent of the other propulsors. This further allows for auto-rotation of the rotor during forward flight without having to disconnect from the power source. Alternatively, the propulsors can all be powered by a common power source through mechanical means. In such case, the rotor will preferably be connected to the power source through a clutch to allow the rotor to be disconnected from the power source for autorotation during forward flight, or to allow the rotor to free-wheel rotate at a speed higher than the speed of the rotation of the output shaft of the power source during inertia takeoff.

Figure 2:
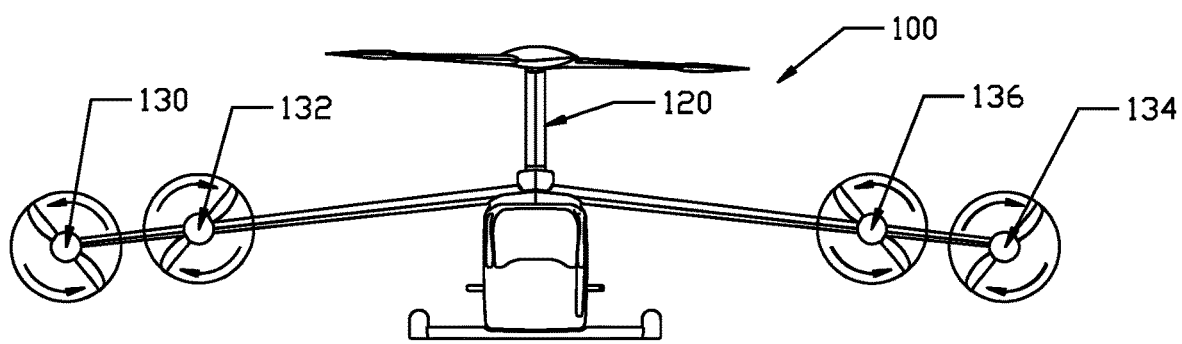
FIG. 2 is a front view of the compound rotorcraft of FIG. 1.
Figure 3:
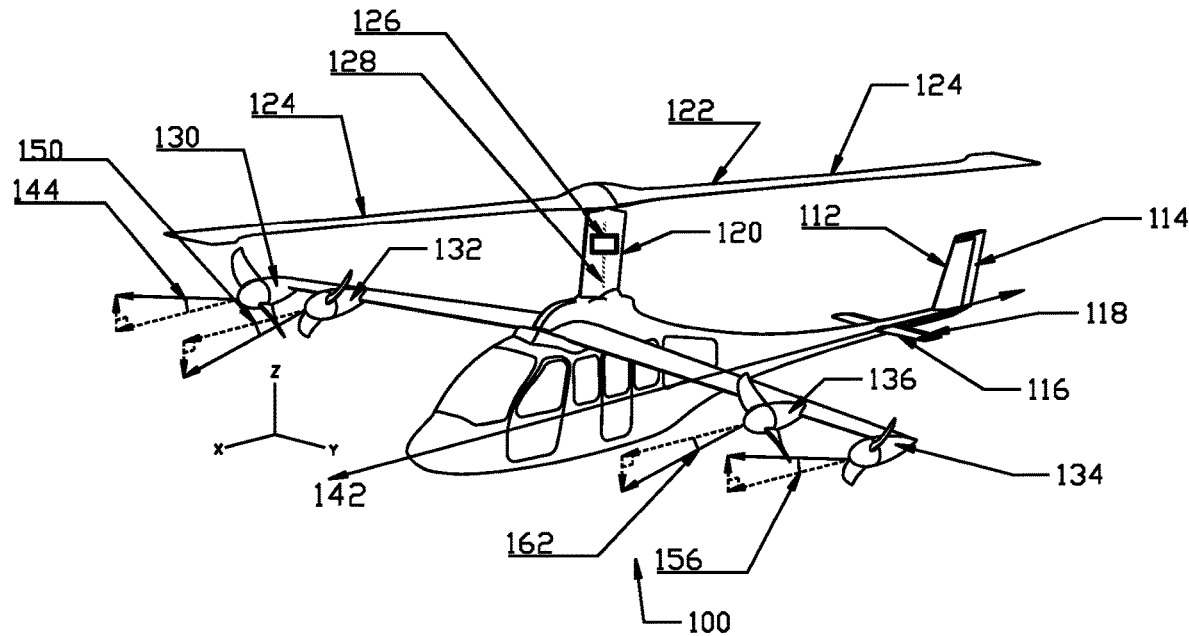
FIG. 3 is an isometric view of the compound rotorcraft of FIG. 1.

Referring to FIGS. 1, 2, and 3, an illustrative embodiment of a compound rotorcraft 100 is presented. The rotorcraft 100 is shown having an elongated fuselage 102. A high aspect ratio wing 104 extends outward from the fuselage 102. The wing 104 is mounted to the fuselage 102 with the wing comprising a first wing half 106 extending to one side of the fuselage 102 and a second wing half 108 extending to the other side of the fuselage 102. The length of each of the first wing half 106 and the second wing half 108 over the chord between the leading edge and trailing edge is configured so as to provide efficient flight at high altitudes; e.g., from 10,000 ft to above 30,000 ft. Each of the first and second wing half 106, 108 may include ailerons 110. The aircraft 100 may also include a vertical stabilizer 112 with a moveable rudder 114, and a horizontal stabilizer 116 with a moveable elevator 118.

A mast 120 extends upward from the fuselage 102 and supports a rotor 122 having at least one pair of rotor blades 124. The rotor 122 may be tiltable in forward and rearward directions relative to fuselage 102. The blades 124 maybe weighted at their ends by heavy weights for increasing stiffness to increase rotor stability at high forward airspeeds; e.g., greater than 150 mph, up to 500 mph. The blades 124 may be constructed generally as shown in U.S. Pat. No. 6,024,325, issued Feb. 15, 2000, all of which material is hereby incorporated by reference. Each of the blades 124 is pivotal to various pitches about a centerline extending from rotor 122. In this embodiment, the rotor 122 may be powered by two electric motors 126 (shown collectively) on a common shaft 128. Each motor 126 connects to the shaft 128 through a simple one-way clutch (not shown), such that if a motor fails, the shaft will still spin, allowing the rotor to be powered by the other motor.

The compound rotorcraft 100 includes a first outboard propeller 130, a first inboard propeller 132, a second outboard propeller 134, and a second inboard propeller 136. Each propeller may be constructed generally as shown in U.S. Pat. No. 6,155,784 issued Dec. 5, 2000, all of which material is hereby incorporated by reference. Each propeller is pivotal, so that the blade pitch can vary. Each of the propellers 130, 132, 134, and 136 are mounted along the wing 104. One propeller is mounted on a distal portion of each wing, and the other two propellers are mounted at a more inboard location on the wing. In some aspects, one propeller is mounted to a tip of each wing such that the propeller forms outermost portion of the wing.

The first outboard propeller 130 comprises a first outboard propeller body 138 and first outboard propeller blades 140. The first outboard propeller body 138 is mounted to the first wing half 106 with the first outboard propeller blades 140 extending from the first outboard propeller body 138. In some aspects, the first outboard propeller 130 is positioned on or forms the outermost portion of the first wing half 106. The first outboard propeller body 138 is mounted at a first incidence angle 144 relative to a longitudinal axis 142 of the fuselage 102 (see FIG. 3). In some embodiments, the first incidence angle 144 is a positive angle such that the first outboard propeller body 138 is tilted upward relative to the longitudinal axis 142 of the fuselage 102. In yet some embodiments, the first incidence angle 144 is a negative angle such that the first outboard propeller body 138 is tilted downward relative to the longitudinal axis 142 of the fuselage 102.

The first inboard propeller 132 comprises a first inboard propeller body 146 and first inboard propeller blades 148. The first inboard propeller body 146 is mounted to the first wing half 106 between the first outboard propeller 130 and the fuselage 102. The first inboard propeller body 146 is mounted at a second incidence angle 150 relative to the longitudinal axis 142 of the fuselage 102. In some aspects, the direction of the second incidence angle 150 differs from the first incidence angle 144. In yet other aspects, the direction of the second incidence angle 150 is the same as the first incidence angle 144. The second incidence angle 150 of the first inboard propeller body 146 may be positive or negative relative to the longitudinal axis 142 to the fuselage 102. In some instances, the second incidence angle 150 may be positive when the first incidence angle 144 is positive or otherwise be negative when the first incidence angle 144 positive.

The second outboard propeller 134 comprises a second outboard propeller body 152 and second outboard propeller blades 154. The second outboard propeller body 152 is mounted to the second wing half 108 with the second outboard propeller blades 154 extending from the second outboard propeller body 152. In some aspects, the second outboard propeller 134 is positioned on or forms the outermost portion of the second wing half 108. The second outboard propeller body 152 is mounted at a third incidence angle 156 relative to the longitudinal axis 142 of the fuselage 102 (see FIG. 3). In some embodiments the third incidence angle 156 is a positive angle such that the second outboard propeller body 152 is tilted upward relative to the longitudinal axis 142 of the fuselage 102. In yet some embodiments, the third incidence angle 156 is a negative angle such that the second outboard propeller body 154 is tilted downward relative to the longitudinal axis 142 of the fuselage 102.

The second inboard propeller 136 comprises a second inboard propeller body 158 and second inboard propeller blades 160. The second inboard propeller body 158 is mounted to the second wing half 108 between the second outboard propeller 134 and the fuselage 102. The second inboard propeller body 158 is mounted at a fourth incidence angle 162 relative to the longitudinal axis 142 of the fuselage 102. In some aspects, the direction of the fourth incidence angle 162 differs from the third incidence angle 156. In yet other aspects, the direction of the fourth incidence angle 162 is the same as the third incidence angle 156. The fourth incidence angle 162 may be positive or negative relative to the longitudinal axis 142 of the fuselage 102. In some instances, the fourth incidence angle 162 may be positive when the third incidence angle 156 is positive or otherwise be negative when the third incidence angle 156 is positive.

Still referring to FIGS. 1, 2, and 3, in some aspects, the first outboard propeller body 138 and the second outboard propeller body 152 are mounted at a positive incidence angle relative to the longitudinal axis 142 of the fuselage 102, and the first inboard propeller body 148 and the second inboard propeller body 158 are mounted at a negative incidence angle relative to the longitudinal axis 142 of the fuselage 102. In yet some aspects, the first outboard propeller body 138 and the second outboard propeller body 152 are mounted at a negative incidence angle relative to the longitudinal axis 142 of the fuselage 102 and the first inboard propeller body 148 and the second inboard propeller body 158 are mounted at a positive incidence angle relative to the longitudinal axis 142 of the fuselage 102.

In some embodiments, each of the propellers 130, 132, 134, 136 is powered by a single, independent motor, such that if any single motor fails, three propellers will still be operational. The first outboard propeller 130 is powered by a first motor 164. The first inboard propeller 132 is powered by a second motor 166. The second outboard propeller 134 is powered by a third motor 168. The second inboard propeller 136 is powered by a fourth motor 170.

In some aspects, the outboard propellers 130 and 134 will be installed at a small positive incidence angle, such that positive thrust will result in a slight upward vertical component of thrust (see FIG. 3). In some aspects, the inboard propellers 148 and 158 will be installed at a small negative incidence angle, such that positive thrust will result in a slight downward vertical component of thrust (see FIG. 3).

Figure 4:
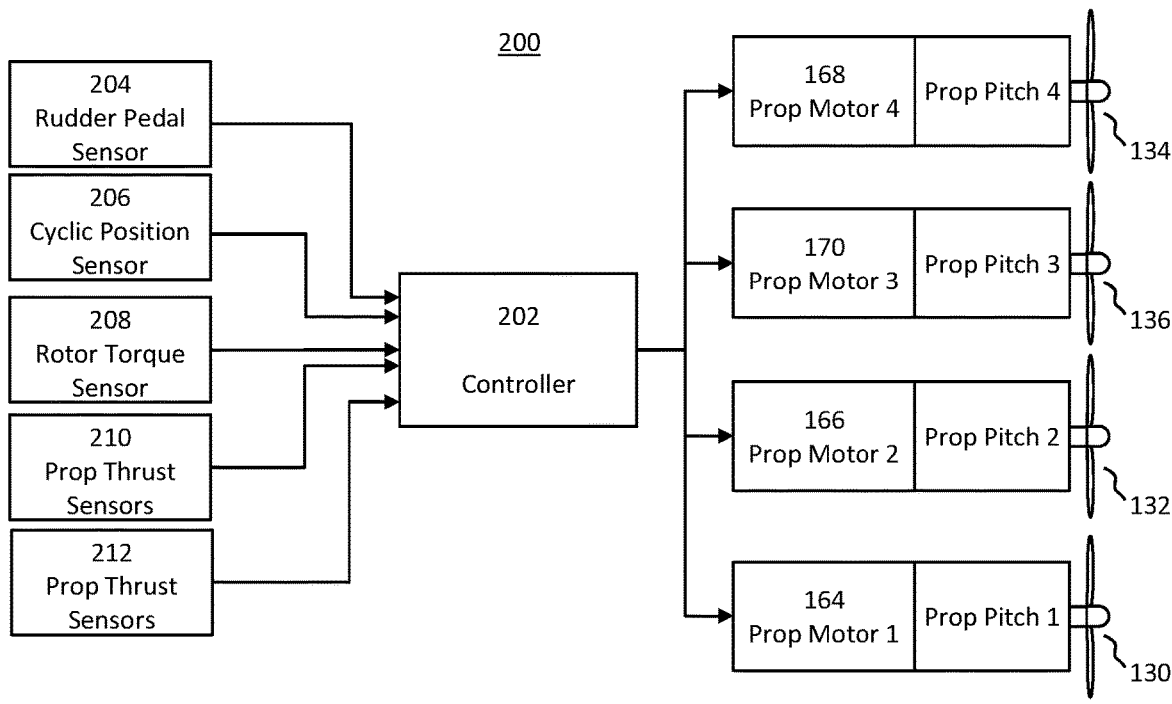
FIG. 4 is a schematic view of an illustrative embodiment of propeller pitch control system used in the compound rotorcraft.

Referring now to FIG. 4 with continued reference to FIGS. 1, 2, and 3, the rotorcraft includes a controller 202 that controls propellers 130, 132, 134, and 136. Controller 202 includes a computer that continuously monitors rotor torque 204, aircraft yaw rate, prop and rotor horsepower, prop and rotor rpm, true air speed, temperature and prop thrust, and controls the pitch and rpm of each propeller to counter rotor torque and maintain the best motor/propeller efficiency in forward flight for any given altitude. In some embodiments, a rudder pedal sensor 204, cyclic position sensor 206, a rotor torque sensor 208, a prop thrust sensor 210, and a prop thrust sensor 212 provide input into the controller 202.

Figure 5:
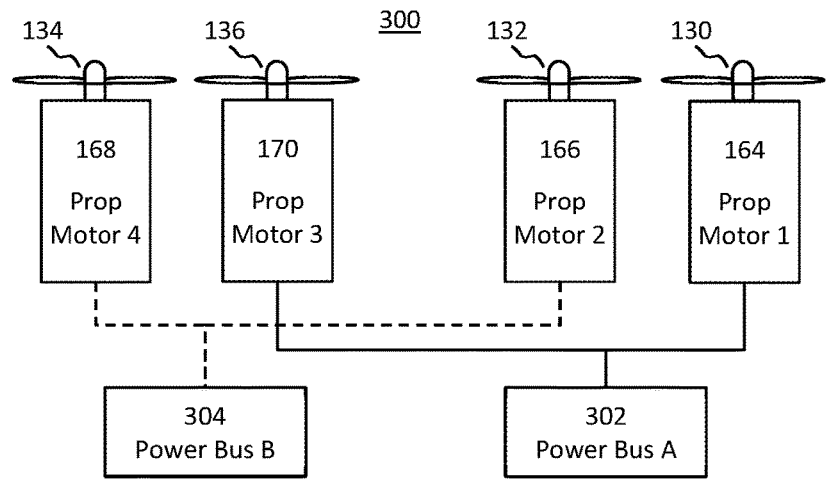
FIG. 5 is a schematic view of an illustrative embodiment of a power bus distribution arrangement for use with a controller and a compound rotorcraft having four propellers.

Referring now to FIG. 5 with continued reference to FIGS. 1-4, an electrical power bus distribution 300 is presented. The electrical power bus will be divided into a Channel A or power bus A 302 and a Channel B or power bus B 304. In some embodiments, Channel A 302 is operable to power the outboard propeller 130 on the starboard side of the aircraft 100 and the inboard propeller 136 on the port side of the aircraft 100, while Channel B 304 is operable to power the outboard propeller 134 on the port side of the aircraft 100 and the inboard propeller 132 on the starboard side of the aircraft 100. In the case of the failure of one electric channel, the other channel will still power two propellers.

In method of operation, the starboard and port props will have a differential thrust between them to balance rotor torque, and a net thrust to propel the aircraft. The differential thrust will be based on rotor torque, yaw rate, and rudder position. With the rudders centered, the controller will balance rotor torque and maintain zero yaw rate. Rudder pedal deflection will instruct the controller to create a higher differential thrust to create a desired yaw rate. The pitch on the inboard and outboard propellers will be controlled proportionately, such that the rolling moments created by vertical thrust components of each propeller balance out to zero moment.

In one embodiment, a thrust thumbwheel may be the pilot's input to specify a desired net thrust. This may be used to change all propellers by some pitch, but maintain the same differential thrust to counter rotor torque. Because typical propellers are much more efficient when generating positive thrust than negative thrust, the optimum load sharing for minimum overall horsepower may be biased towards greater thrust on the first wing half 106, such that there is a net positive thrust on the aircraft, which will be balanced with a slight aft tilt of the main rotor 122.

To augment roll control or provide roll control in the event of failure of other roll control methods, the thrust of the inboard and outboard propellers may be controlled proportionately, to create a given rolling moment without changing the yawing moment. For example, to create a rolling moment to bank the aircraft to the right, in a condition when all four propellers are generating positive thrust, the thrust on the left tip propeller and inboard right propeller will be increased, and the thrust on the right tip propeller and left inboard propeller will be decreased. Because the inboard propellers have a smaller distance to the centerline, their thrust will change by a proportionately larger amount to create the same magnitude change in yaw moment as that of the tip propellers, but in the opposite direction, such that the overall yaw moment does not change.

The four propellers will be counter-rotating to balance prop torque. The two tip propellers may rotate with the direction of rotation being outboard on the top half of the arc of rotation, and inboard on the bottom half of the arc of rotation. This may impart a rotational momentum to the slipstream behind the propellers in the opposite direction of the wing tip vortex 172, weakening the vortex and reducing the induced drag. The inboard propellers will rotate in the opposite direction of each other. In one embodiment, each propeller will rotate in the opposite direction of the wing tip propeller on that wing half. In another embodiment, each propeller will rotate in the same direction as the wing tip propeller on that wing half.

In one manner of operation, positive or negative thrust is applied to the first outboard propeller and the second outboard propeller, wherein applying positive thrust of the first outboard propeller and the second outboard propeller results in a slight upward vertical component of thrust. Positive or negative thrust is also applied to the first inboard propeller and the second inboard propeller, where applying positive thrust of the first inboard propeller and the second inboard propeller results in a slight upward vertical component of thrust.

In some aspects, a yawing moment maybe created to counter rotor torque or apply yaw to the aircraft by changing the thrust of the first outboard propeller and the first inboard propeller in changing the thrust of the second outboard propeller and the second inboard propeller and op. cit. direction to the change of the first outboard propeller and the first inboard propeller.

In some aspects, a rolling moment to bank the aircraft maybe created by changing the thrust of the first outboard propeller and the second inboard propeller and op. cit. direction to the change of the second outboard propeller and the first inboard propeller. Likewise changing the thrust of the second hour Pellerin the first inboard propeller.

Referring to FIGS. 6, 7, 8, and 12, another illustrative embodiment of a compound rotorcraft 400 is presented. The compound aircraft 400 is similar to the compound aircraft 100 presented in FIGS. 1-5, in the compound aircraft 400 comprises four propellers mounted thereon with the main difference being placement of the propellers Like elements will use like reference numerals; likewise, some elements may not be repeated for simplicity. The rotorcraft 400 is shown having an elongated fuselage 102. A high aspect ratio wing 104 extends outward from the fuselage 102. The wing 104 is mounted to the fuselage 102 with the wing comprising a first wing half 106 extending to one side of the fuselage 102 and a second wing half 108 extending to the other side of the fuselage 102.

The aircraft 400 has four total propellers. Two propellers are mounted on each wing tip, with one propeller on each tip being in a tractor configuration in front of the wing, and the other propeller on each tip being in a pusher configuration behind the wing. A first propeller 430 is mounted on the front of the first wing half 106, a second propeller 432 is mounted behind the first propeller 430 on the back of the first wing half 106, a third propeller 434 is mounted on the front of the second wing half 108, and a fourth propeller 436 is mounted behind the third propeller 434 on the back of the second wing half 108. The first propeller 430 and the third propeller 434 have a tractor configuration. The second propeller 432 and the fourth propeller 436 have a pusher configuration. In some aspects the first propeller 430 and the second propeller 432 are in line with each other at the tip of the first wing half 106, and the third propeller 434 and the fourth propeller 436 are in line with each other at the tip of the second wing half 108.

In some aspects, the first propeller 430 and the second propeller 432 are positioned in line with each other and mounted to a distal portion of the first wing half 106, while the third propeller 434 and the fourth propeller 436 are positioned in line with each other and mounted to a distal portion of the second wing half 108. In yet some aspects, the first propeller 430 and the second propeller 432 are positioned in line with each other and mounted to the tip of the first wing half 106 such that the first propeller 430 and the second propeller 432 forms on outermost edge of the first wing half 106. In yet some aspects, the third propeller 434 and the fourth propeller 436 are positioned in line with each other and mounted to the tip of the second wing half 108 such that the third propeller 434 and the fourth propeller 436 forms and outermost edge of the second wing half 108.

Each propeller may be constructed generally as shown in U.S. Pat. No. 6,155,784 issued Dec. 5, 2000, all of which material is hereby incorporated by reference. Each propeller is pivotal, so that the blade pitch can vary.

The first propeller 430 comprises a first propeller body 438 and first propeller blades 440. The first propeller body 438 is mounted to the first wing half 106 with the first propeller blades 440 extending from the first propeller body 438. In some aspects, the first propeller 430 is positioned on or forms the outermost portion of the first wing half 106. The first propeller body 440 is mounted at a first incidence angle 444 relative to the longitudinal axis 142 of the fuselage 102 (see FIG. 3). The first incidence angle 444 may be a positive angle such that the first body 438 is tilted upwards or a negative angle such that the first body 438 is tilted downwards.

The second propeller 432 comprises a second propeller body 448 and second propeller blades 446. The second propeller body 448 is mounted to the first wing half 106 with the second propeller blades 446 extending from the second propeller body 448. In some aspects, the second propeller 432 is positioned on or forms the outermost portion of the first wing half 106 together with the first propeller 130. The second propeller body 448 is mounted at a second incidence angle 450 relative to the longitudinal axis 142 of the fuselage 102. The second incidence angle 450 may be a positive or negative angle.

The third propeller 434 comprises a third propeller body 450 and third propeller blade 454. The third propeller body 434 is mounted to the second wing half 108 with the third propeller blades 454 extending from the third propeller body 452. In some aspects, the third propeller 434 is positioned on or forms outermost portion of the second wing half 108. The third propeller body 452 is mounted at a third incidence angle 456 relative to the longitudinal axis 142 of the fuselage 102. In some embodiments, the third incidence angle 456 is a positive angle and in other embodiments it is a negative angle.

The fourth propeller 436 comprises a fourth propeller body 458 and fourth propeller blades 460. The fourth propeller body 458 is mounted to the second wing half 108 with the fourth propeller blades 458 extending from the fourth propeller body 458. In some aspects, the fourth propeller 436 is positioned on or forms the outermost portion of the second wing half 108 together with the third propeller 434. The fourth propeller body 458 is mounted at a fourth incidence angle 462 relative to the longitudinal axis 142 of the fuselage 102. The fourth incidence angle 462 may be a positive or negative angle.

Figure 6:
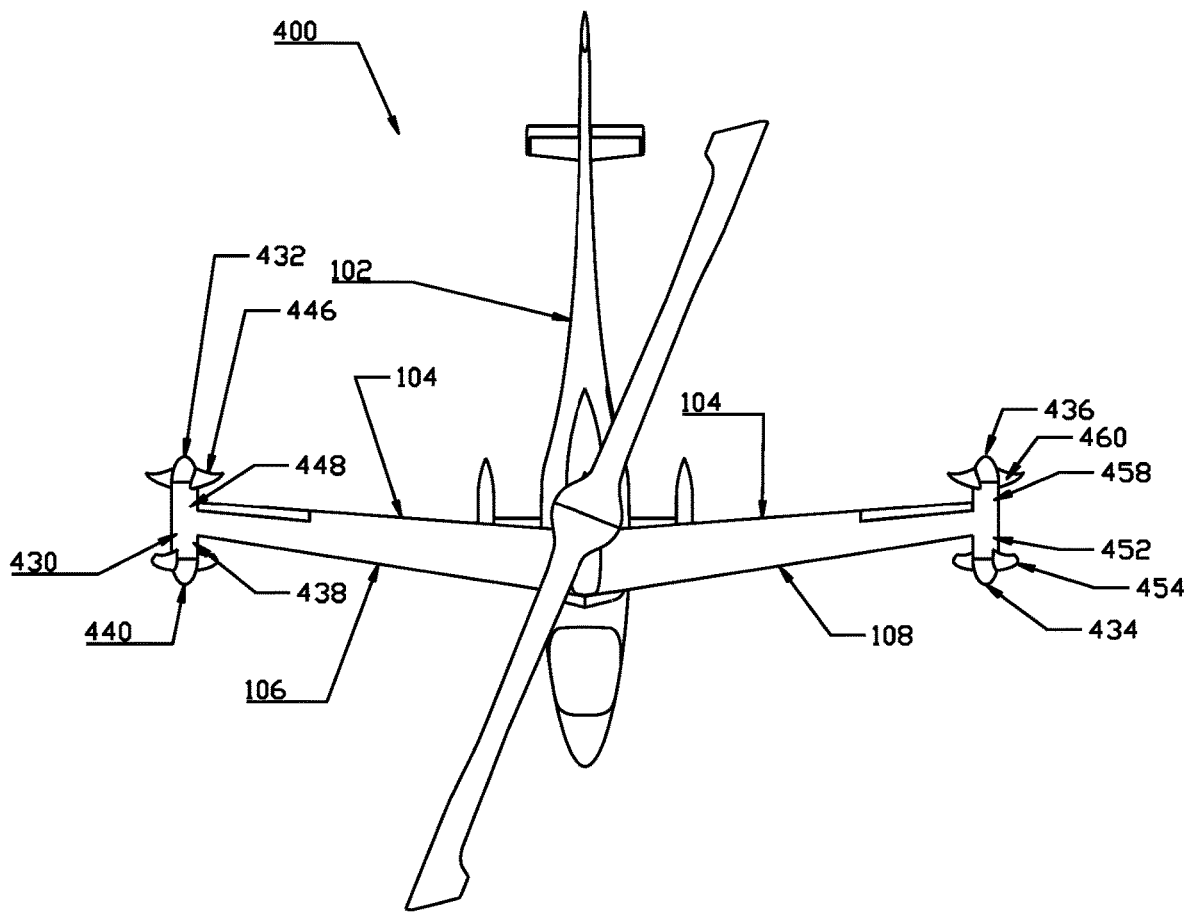
FIG. 6 is a top view of another illustrative embodiment of a compound rotorcraft having four propellers.
Figure 7:
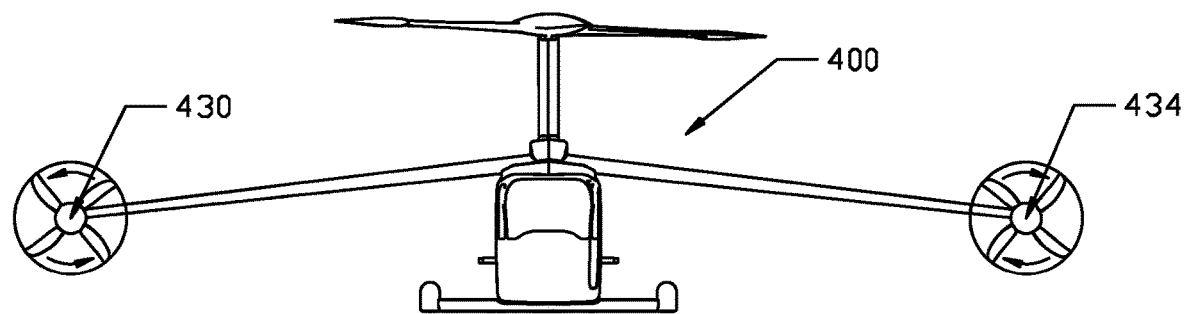
FIG. 7 is a front view of the compound rotorcraft of FIG. 6.
Figure 8:
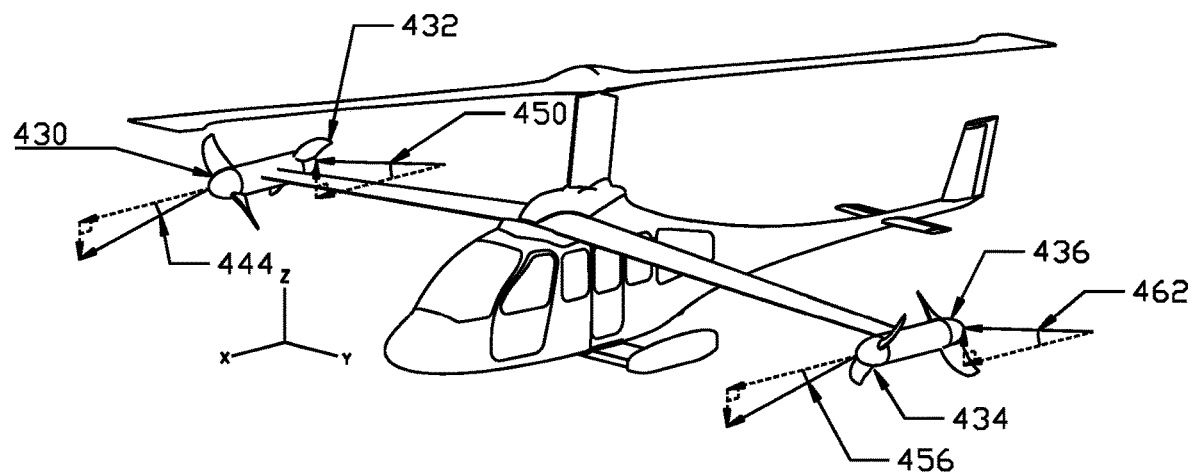
FIG. 8 is an isometric view of the compound rotorcraft of FIG. 6.
Figure 12:
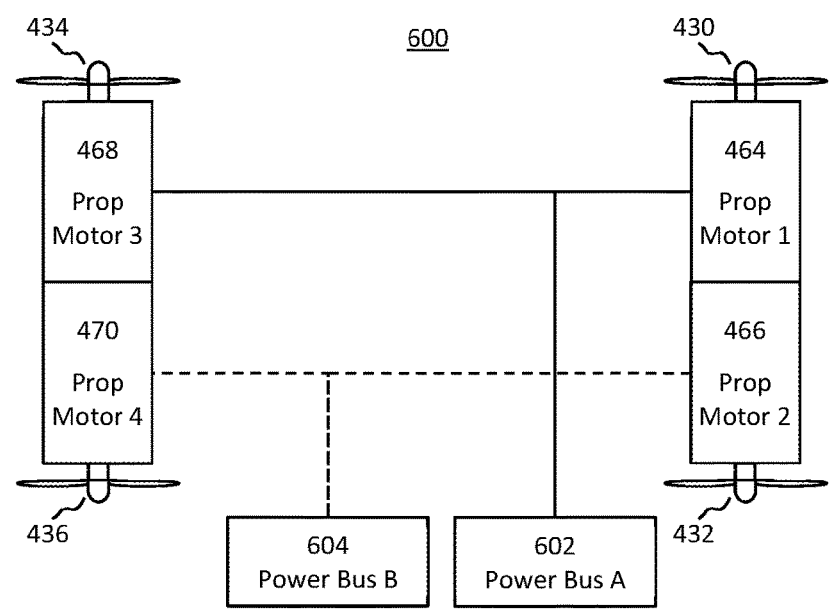
FIG. 12 is a schematic view of another illustrative embodiment of a power bus distribution arrangement for use with a controller in a compound rotorcraft having four propellers.

Referring to FIG. 12, with continued reference to FIGS. 6-8, each of the propellers 430, 432, 434, 436 may be powered by a single, independent motor, such that if any single motor fails, three propellers will still be operational. The first propeller 430 may be powered by a first motor 464, the second propeller 432 may be powered by a second motor 466, the third propeller 434 may be powered by a third motor 468, and the fourth propeller 436 may be powered by a fourth motor 470.

The rotorcraft 400 may utilize an electrical power bus distribution 600 (FIG. 12) with the controller 202 (illustrated in FIG. 4 and described above). The power bus 600 may be divided into a Channel A or power bus A 602 and a Channel B or power bus B 604. In some embodiments, Channel A 602 is operable to power the tractor propellers 430 and 434 on each tip, while Channel B 604 is operable to power the pusher propellers 432 and 436 on each tip of the wing 104. In the case of the failure of one electric channel, the other channel will still power two propellers.

In an illustrative embodiment, the tractor propellers 430, 434 will be installed at a small negative incidence angle, such that positive thrust will result in a slight downward vertical component of thrust. In some aspects, the pusher propellers 432, 436 may be installed at a small positive incidence angle, such that positive thrust will result in a slight upward vertical component of thrust.

Aircraft has a controller 200 that controls propellers 430, 432, 434, 436. Controller 200 includes a computer that continuously monitors rotor torque, aircraft yaw rate, prop and rotor horsepower, prop and rotor rpm, true air speed, temperature and prop thrust, and controls the pitch and rpm of each propeller to counter rotor torque and maintain the best motor/propeller efficiency in forward flight for any given altitude.

In operation, the starboard 430, 432 and port 434, 436 props will have a differential thrust between them to balance rotor torque, and a net thrust to propel the aircraft. The differential thrust will be based on rotor torque, yaw rate, and rudder position. With the rudders centered, the controller will balance rotor torque and maintain zero yaw rate. Rudder pedal deflection will instruct the controller to create a higher differential thrust to create a desired yaw rate. When controlling for yaw, the pitch on the tractor and pusher propellers on a given tip will change by essentially the same amount, such that the vertical thrust components of each propeller on a given side of the aircraft remains the same to balance out to zero rolling moment.

In one embodiment, a thrust thumbwheel will be the pilot's input to specify a desired net thrust. This will change all propellers by some pitch, but maintain the same differential thrust to counter rotor torque. Because typical propellers are much more efficient when generating positive thrust than negative thrust, the optimum load sharing for minimum overall horsepower may be biased towards greater thrust on the first wing half 106, such that there is a net positive thrust on the aircraft, which will be balanced with a slight aft tilt of the main rotor 122.

To augment roll control or provide roll control in the event of failure of other roll control methods, the thrust of the tractor and pusher propellers will be controlled proportionately, to create a given rolling moment without changing the yawing moment. For example, to create a rolling moment to bank the aircraft to the right (starboard), the thrust on the left pusher propeller and right tractor propeller will be increased, and the thrust on the right pusher propeller and left tractor propeller will be decreased by a corresponding amount. Due to the negative incidence angle of the tractor props and the positive incidence of the pusher props, the change in vertical thrust components will create the desired rolling moment to bank the aircraft to the right, while the combined longitudinal thrust components at each tip will remain the same.

The four propellers will be counter-rotating to balance prop torque. Each propeller will rotate with the direction of rotation being outboard on the top half of the arc of rotation, and inboard on the bottom half of the arc of rotation. This will impart a rotational momentum to the slipstream behind the propellers in the opposite direction of the wing tip vortex 572, weakening the vortex and reducing the induced drag.

Referring to FIGS. 9, 10, 11 and 13, an illustrative embodiment of a compound rotorcraft 500 is presented. The compound rotorcraft 500 is similar to the compound rotorcraft 100 presented in FIGS. 1-5, but differs from the compound rotorcraft 100 in that the compound rotorcraft 500 includes two propellers instead of four propellers. Like elements will use it like reference numerals; likewise, some elements may not be repeated for simplicity.

The rotorcraft 500 is shown having an elongated fuselage 102. A high aspect ratio wing 104 extends outward from the fuselage 102. The wing 104 is mounted to the fuselage 102 with the wing comprising a first wing half 106 extending to one side of the fuselage 102 and a second wing half 108 extending to the other side of the fuselage 102.

A mast extends upward from the fuselage and supports at least one pair of blades. Rotor is tiltable in forward and rearward directions relative to fuselage. Blades are weighted at their ends by heavy weights for increasing stiffness at increase rotor stability at high forward airspeeds. Blades may be constructed generally as shown in U.S. Pat. No. 6,024,325, issued Feb. 15, 2000, all of which material is hereby incorporated by reference. Each blade is pivotal to various pitches about a centerline extending from rotor.

The aircraft 500 includes two propellers. One propeller is mounted on each wing tip. A first propeller 530 is mounted on the end of the first wing half 106 and a second propeller 534 is mounted on the end of the second wing half 108. Each propeller may be constructed generally as shown in U.S. Pat. No. 6,155,784 issued Dec. 5, 2000, all of which material is hereby incorporated by reference. Each propeller is pivotal, so that the blade pitch can vary. Each propeller 530, 534 may be powered by two motors on a common shaft. Each motor connects to the shaft through a simple one-way clutch, such that if a motor fails, the shaft will still spin, allowing that propeller to be powered by the other motor on that shaft.

The first propeller 530 comprises a first propeller body 538 and first propeller blades 540. The first propeller body 538 is mounted to the first wing half 106 with the first propeller blades 540 extending from the first propeller body 538. In some aspects, the first propeller 530 is positioned on the forms the outermost portion of the first wing half 106. The first propeller body 540 is mounted at an incidence angle 544 relative to the longitudinal axis 142 of the fuselage 102 (see FIG. 3). The first incidence angle 544 may be a positive angle such that the first body 538 is tilted upwards or a negative angle such that the first body 538 is tilted downwards.

The second propeller 534 comprises a second propeller body 552 and a second propeller blade 554. The second propeller body 552 is mounted to the second wing half 108 with the second propeller blades 554 extending from the second propeller body 552. In some aspects, the second propeller 534 is positioned honor forms and outermost portion of the second wing half 108. The second propeller body 552 is mounted at a second incidence angle 556 relative to the longitudinal axis 142 of the fuselage 102. In some embodiments, the second incidence angle 556 is a positive angle and other embodiments it is a negative angle.

Figure 9:
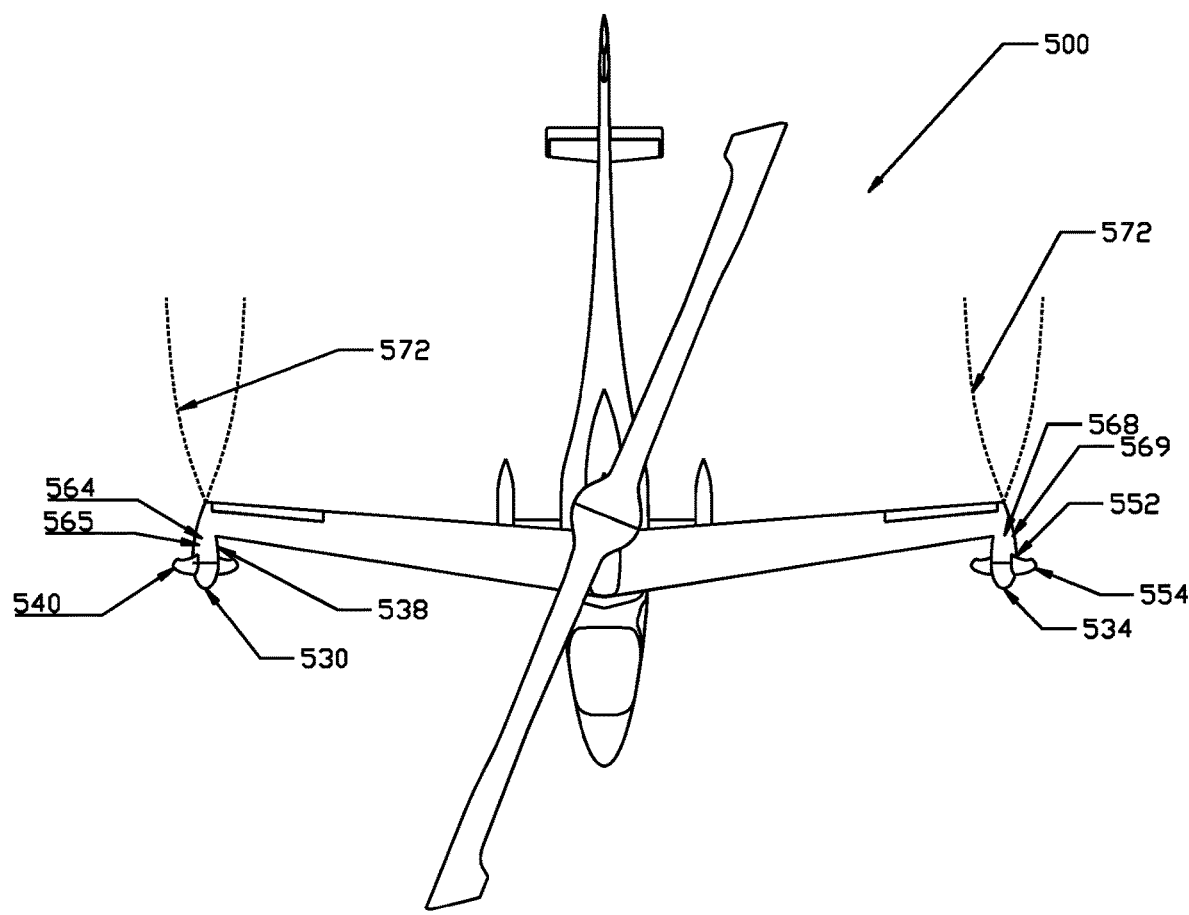
FIG. 9 is a top view of an illustrative embodiment of a compound rotorcraft having two propellers.
Figure 10:
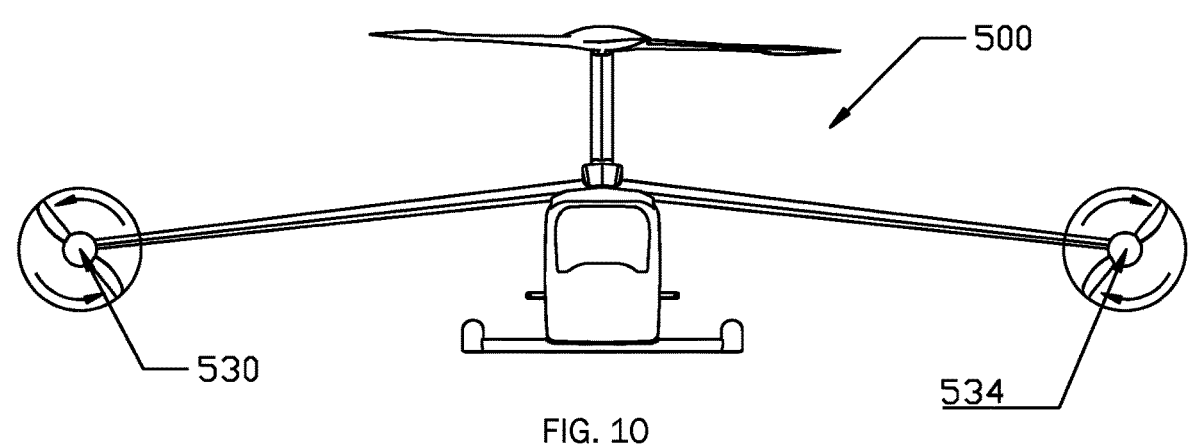
FIG. 10 is a front view of the compound rotorcraft of FIG. 9.
Figure 11:
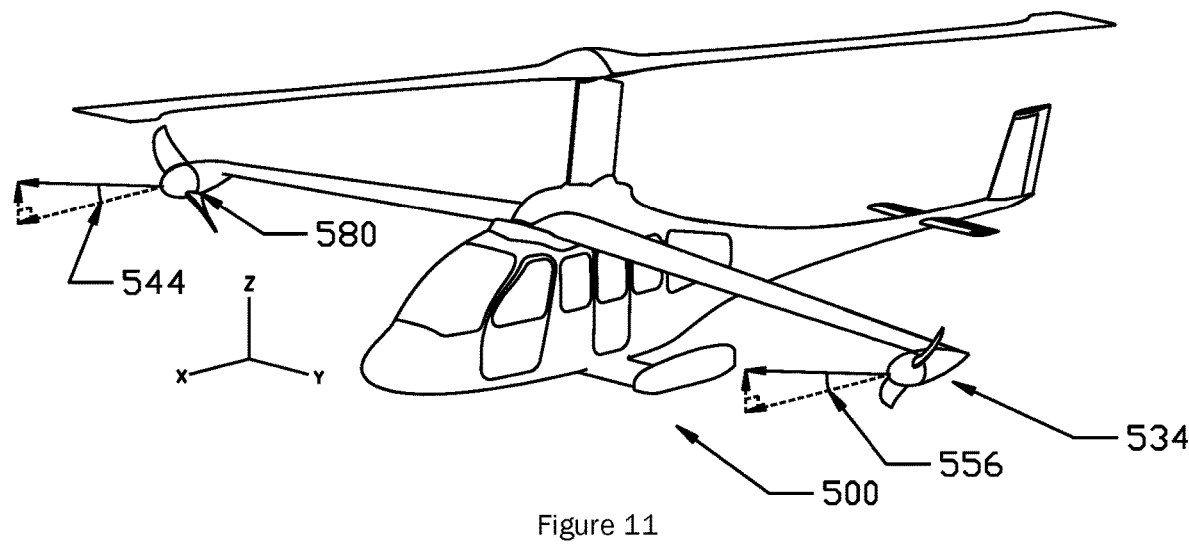
FIG. 11 is an isometric view of the compound rotorcraft of FIG. 9.
Figure 13:
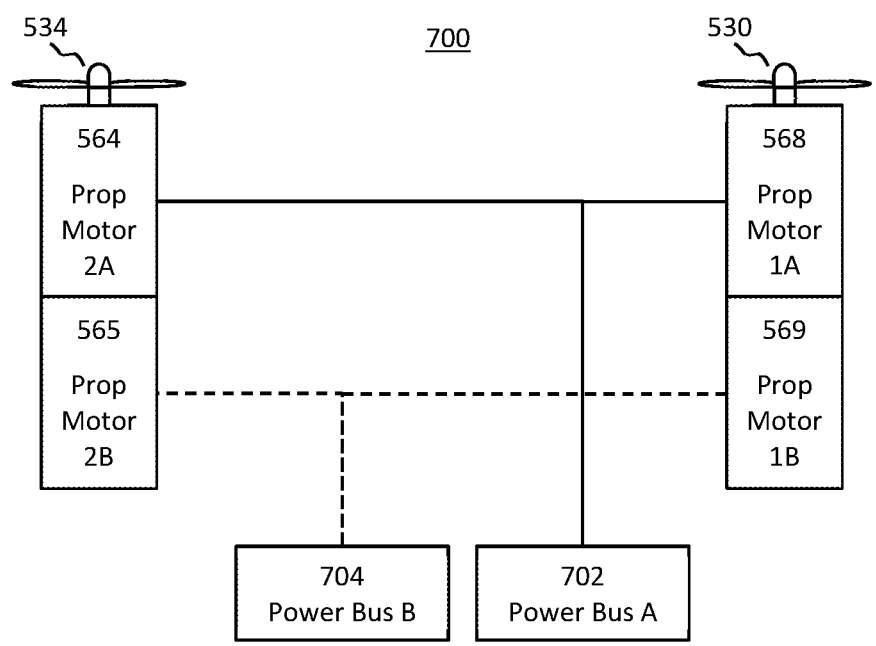
FIG. 13 is a schematic view of an illustrative embodiment of a power bus distribution arrangement for use with the controller in a compound rotorcraft having two propellers.

Referring to FIG. 13, with continued reference to FIGS. 9-11, the first propeller 530 may be powered by two motors 568, 569 on a common shaft and the second propeller 534 may be powered by two motors 564, 565 on a common shaft. Each motor connects to the shaft through a simple one-way clutch, such that if a motor fails, the shaft will still spin, allowing that propeller to be powered by the other motor on that shaft.

The rotorcraft 500 may utilize an electrical power bus distribution 700 (FIG. 13) with the controller 202 (illustrated in FIG. 4 described above). The power bus 700 may be divided into a Channel A or power bus 702 and a Channel B or a power bus 704. In some embodiments, Channel A will power one motor per propeller 568, 564, while Channel B will power the other motor 569, 565 for each propeller. In the case of the failure of one electric channel, the other channel will still power the propellers.

In some aspects, the propellers will be installed at a small positive incidence angle, such that positive thrust will result in a slight upward vertical component of thrust.

Aircraft has a controller 200 that controls propellers 530, 534. Controller 200 includes a computer that continuously monitors rotor torque, aircraft yaw rate, prop and rotor horsepower, prop and rotor rpm, true air speed, temperature and prop thrust, and controls the pitch and rpm of each propeller to counter rotor torque and maintain the best motor/propeller efficiency in forward flight for any given altitude.

In operation, the propellers will have a differential thrust between them to balance rotor torque, and a net thrust to propel the aircraft. The differential thrust will be based on rotor torque, yaw rate, and rudder position. With the rudders centered, the controller will balance rotor torque and maintain zero yaw rate. Rudder pedal deflection will instruct the controller to create a higher differential thrust to create a desired yaw rate. Because of the incidence angle of the propellers, this will also create a slight rolling moment, which will be countered with a slight deflection of the rotor through the cyclic control.

A thrust thumbwheel will be the pilot's input to specify a desired net thrust. This will change both propellers by some pitch, but maintain the same differential thrust to counter rotor torque. Because the positive thrust propeller will be more efficient than the negative thrust propeller, the optimum load sharing for minimum overall horsepower will be with more positive thrust than negative thrust.

To augment roll control or provide roll control in the event of failure of other roll control methods, the thrust of the propellers will be controlled proportionately. For example, to create a rolling moment to bank the aircraft to the right, the thrust on the left tip propeller will be increased, and the thrust on the right tip propeller will be decreased. Due to the positive incidence angle of the propellers, the change in vertical thrust components will create the desired rolling moment to bank the aircraft to the right. However, this will also create a yawing moment in a clockwise direction when viewed from above. When there is sufficient airspeed over the rudder, this yawing moment can be counteracted through rudder deflection. When the airspeed is too low for the rudder to fully balance the yawing moment, the aircraft will yaw nose right. This will accelerate the left wing and slow the right wing, slightly increasing the airflow and lift on the left wing while slightly decreasing the airflow on lift on the right wing, increasing the net rolling moment in the desired direction.

The propellers will be counter-rotating to balance prop torque. Each propeller will rotate with the direction of rotation being outboard on the top half of the arc of rotation, and inboard on the bottom half of the arc of rotation. This will impart a rotational momentum to the slipstream behind the propellers in the opposite direction of the wing tip vortex, weakening the vortex and reducing the induced drag.

In the detailed description herein of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The detailed description is, therefore, not to be taken in a limiting sense, and the scope of the present invention is defined only by the claims. Unless otherwise indicated, as used throughout this document, "or" does not require mutual exclusivity.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed is:

1. A method for operating a compound rotorcraft comprising:
   mounting a first outboard propeller to a distal end of a first wing half at a first incidence angle relative to a centerline of a fuselage;
   mounting a second outboard propeller to a distal end of a second wing half at a second incidence angle relative to the center line of the fuselage;
   mounting a first inboard propeller to the first wing half between the first outboard propeller and the fuselage;
   mounting a second inboard propeller to the second wing half between the second outboard propeller in the fuselage;
   applying positive or negative thrust to the first outboard propeller and the second outboard propeller, wherein applying positive thrust to the first outboard propeller and the second outboard propeller results in a slight upward vertical component of thrust; and
   applying positive or negative thrust to the first inboard propeller and the second inboard propeller, where applying positive thrust to the first inboard propeller and the second inboard propeller results in a slight downward vertical component of thrust.

2. The method of claim 1, further comprising
   mounting the first outboard propeller to a tip of the first wing such that a portion of a first outboard propeller body extends beyond the tip of the first wing, and
   mounting the second outboard propeller to a tip of the second wing such that a portion of the second outboard propeller body extends beyond the tip of the second wing.

3. The method of claim 1, further comprising:
   rotating first outboard propeller blades that are attached to the first outboard propeller in a direction outboard along the top half of the arc of rotation and inboard on the bottom half of the arc rotation to impart a rotational momentum to the slipstream behind the first outboard propeller in a direction opposite of a first wing tip vortex; and
   rotating second outboard propeller blades that are attached to the second outboard propeller in a direction outboard along the top half of the arc of rotation and inboard on the bottom half of the arc of rotation to impart a rotational momentum to the slipstream behind the second outboard propeller in a direction opposite of a second wing tip vortex.

4. The method of claim 1, further comprising:
   changing the thrust of the first outboard propeller and the first inboard propeller; and
   changing the thrust of the second outboard propeller and the second inboard propeller in an opposite direction to the change of the first outboard propeller and the first inboard propeller, thereby creating a yawing moment to counter rotor torque or yaw the aircraft.

5. The method of claim 1, further comprising:
   changing the thrust of the second outboard propeller and the first inboard propeller; and
   changing the thrust of the first outboard propeller and the second inboard propeller in an opposite direction to the change of the second outboard propeller and the first inboard propeller, thereby creating a rolling moment to bank the rotorcraft.

* * * * *